US007736229B1

(12) United States Patent
Goldscheider

(10) Patent No.: US 7,736,229 B1
(45) Date of Patent: Jun. 15, 2010

(54) METHOD AND SYSTEM FOR PLAYING A GAME

(75) Inventor: Daniel Goldscheider, Zug (CH)

(73) Assignee: YES International AG, Zug (CH)

( * ) Notice: Subject to any disclaimer, the term of this patent is extended or adjusted under 35 U.S.C. 154(b) by 1332 days.

(21) Appl. No.: 11/209,380

(22) Filed: Aug. 22, 2005

(51) Int. Cl.
*A63F 13/00* (2006.01)

(52) U.S. Cl. .............................. 463/35; 463/10; 463/16; 463/40

(58) Field of Classification Search .................... 463/35
See application file for complete search history.

(56) References Cited

U.S. PATENT DOCUMENTS

| | | | |
|---|---|---|---|
| 6,364,767 | B1 | 4/2002 | Brossard et al. |
| 6,760,595 | B2 | 7/2004 | Inselberg |
| 2005/0144020 | A1 | 6/2005 | Muzaffar et al. |

OTHER PUBLICATIONS

Latest Text Messaging SMS news, Medial Centre, The 40-Hour Famine has TXT appeal, http://www.text.it/mediacentre/default.asp?intPageId=432; Mar. 26, 2003, 1 page.

Wireless Week—Radio Stations Get TXT MSG Vibes, Reed Business Information, http://www.wirelessweek.com/article/CA521447.html; Jan. 26, 2004, 2 pages.

*Primary Examiner*—John M Hotaling, II
*Assistant Examiner*—Jeffrey Wong
(74) *Attorney, Agent, or Firm*—Brinks Hofer Gilson & Lione

(57) ABSTRACT

A method and system for playing a game are provided. In one embodiment, a party selects one or more songs. A set of songs is then randomly selected from those songs that were actually played, e.g., by a radio station, during a time period. These randomly-selected songs are the contesting-winning songs. If the song(s) that the party selected matches any of the songs in the randomly-selected set, the party is awarded a prize. Accordingly, the party wins a prize if (1) the radio station plays one of the songs the party selected and (2) that song is one of the randomly-selected songs. The award can be tiered such that the size of the prize increases as the number of songs the party guesses correctly increases.

14 Claims, 3 Drawing Sheets

| | probability of getting x songs right | | | |
|---|---|---|---|---|
| calls | 1 | 2 | 3 | 4 |
| 1 | 0.80% | | | |
| 2 | 1.59% | 0.00% | | |
| 3 | 2.37% | 0.01% | 0.0000% | |
| 4 | 3.14% | 0.03% | 0.0001% | 0.0000000004% |

METHOD AND SYSTEM FOR PLAYING A GAME

BACKGROUND

Interactive mobile phone services provide information and entertainment to users. For example, YES, Inc. runs a service in which anyone with a mobile phone can identify, rate, share, and buy any song that has played on a radio station in the last 24 hours. In operation, a caller dials 888-YES-8888 on his mobile phone to connect to an interactive voice response system. The caller then states the name of the station and the time that the song was played to hear a sample of the song as well as information about the artist, track, and album. Callers are able to rate and buy the song. Stations receive feedback regarding how their audience likes individual songs.

DETAILED DESCRIPTION OF THE PRESENTLY PREFERRED EMBODIMENTS

By way of introduction, the preferred embodiments described herein relate to a game in which a party selects one or more songs. A set of songs is then randomly selected from those songs that were actually played, e.g., by a radio station, during a time period. These randomly-selected songs are the contesting-winning songs. If the song(s) that the party selected matches any of the songs in the randomly-selected set, the party is awarded a prize. Accordingly, the party wins a prize if (1) the radio station plays one of the songs the party selected and (2) that song is one of the randomly-selected songs. The award can be tiered such that the size of the prize increases as the number of songs the party guesses correctly increases.

Figure 1:
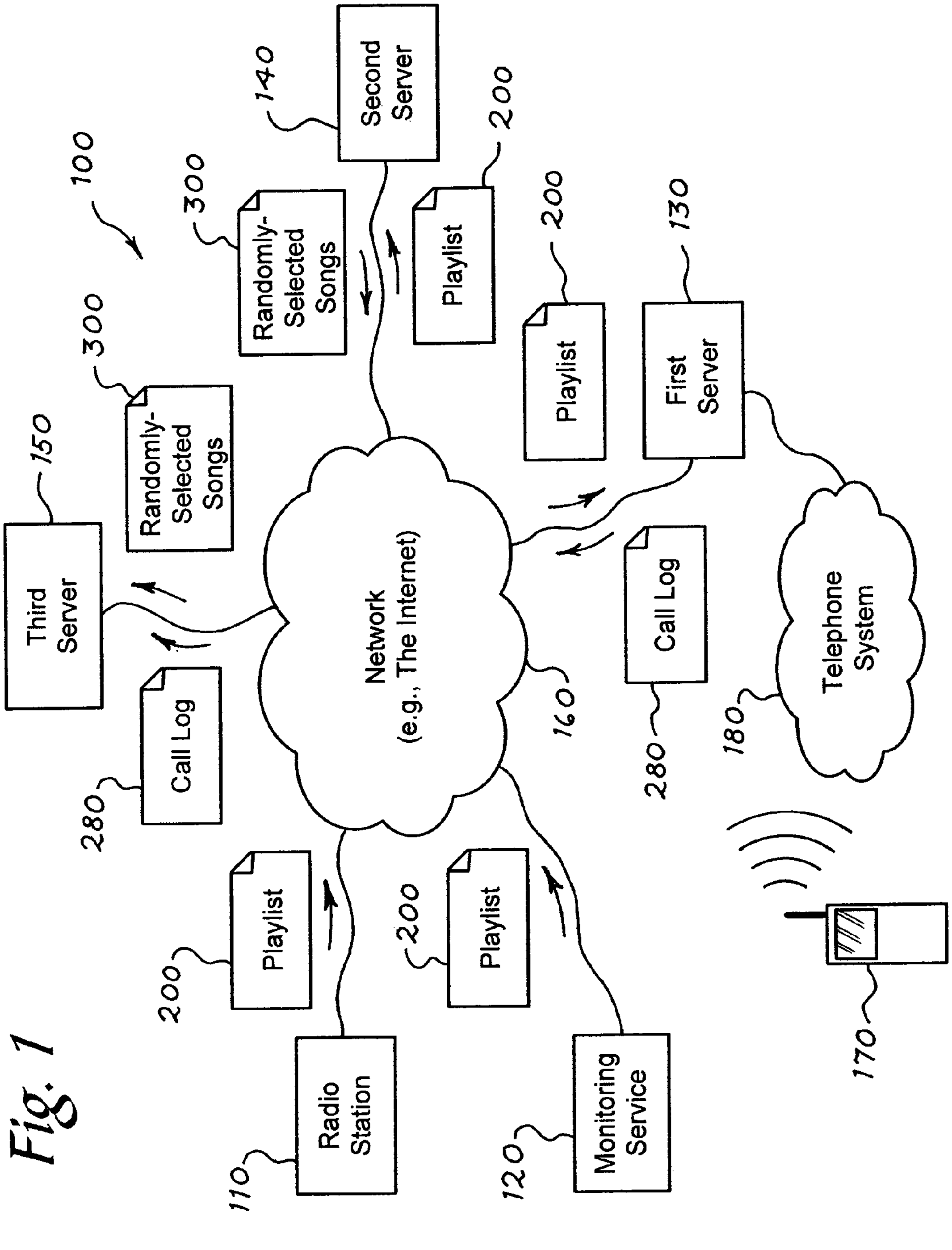
FIG. 1 is an illustration of a system of a preferred embodiment.

Turning now to the drawings, FIG. 1 is a block diagram of a system 100 of a preferred embodiment. This system comprises a radio station 110, a monitoring service 120, and first, second, and third servers 130, 140, 150, all in communication with one another through a network 160, such as the Internet. As used herein, the phrase "in communication with" means directly in communication with or indirectly in communication with through one or more named or unnamed elements. The first server 130 communicates with a wireless telecommunication device 170 (e.g., a cell phone, a portable computer, etc.) through a telephone system 180 (e.g., a landline telecommunication system, a wireless telecommunication system, a voice-over-IP telecommunication system, etc. or any combination thereof). It should be noted that while a wireless telecommunication device 170 is shown in FIG. 1, a wired telecommunication device (e.g., a landline telephone) can be used. It should also be noted that the term "radio station" refers to any entity that broadcasts songs to third parties. A radio station can be a traditional radio station (i.e., one that broadcasts songs via wireless transmission through electromagnetic radio waves in the approximate frequency range of 10 kilohertz to 300,000 megahertz), a satellite radio station, or an Internet radio station. Also, instead of using a radio station, a song (with or without an accompanying video) can be played by a television station (e.g., MTV, MTV2, VH1, etc.). Accordingly, a song is "played" either when the song is played by itself or in conjunction with a music video.

Figure 2:
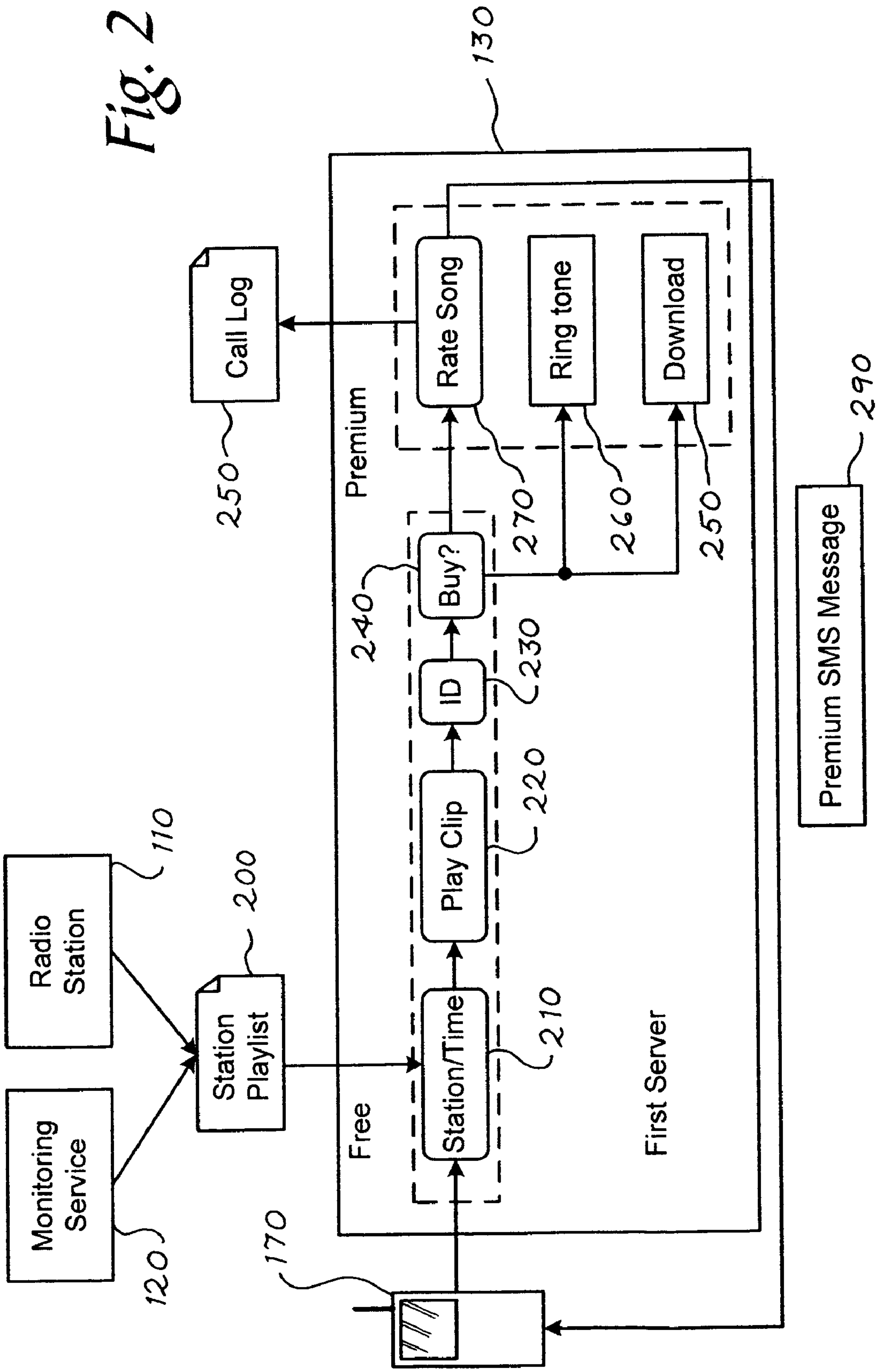
FIG. 2 is an illustration of a process flow of a preferred embodiment.
Figures 3, 4:
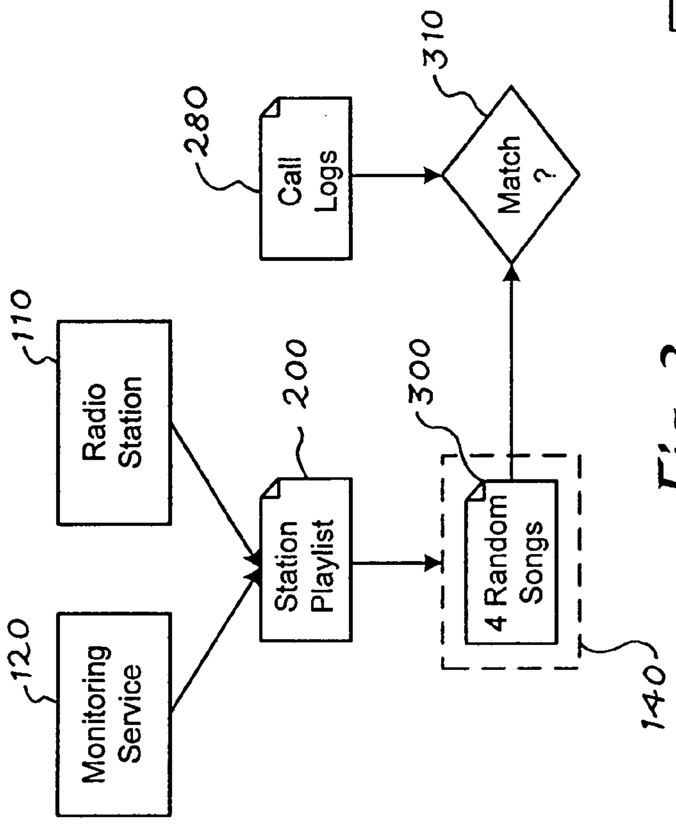
FIG. 3 is another illustration of a process flow of a preferred embodiment.
FIG. 4 is a chart showing the probability of getting X songs right versus the number of calls placed by a party.

The operation of this system 100 will be described in conjunction with FIGS. 2 and 3. In general, a party using the wireless communication device 170 dials a number to connect to the first server 130 after hearing a song played by the radio station 110 (the "song of interest"). The first server 130 uses knowledge of the songs played by the radio station 110 to provided services to parties interacting with the first server 130. The first server 130 obtains the knowledge of the songs played by the radio station 110 through a station playlist 200, which lists the songs played by the radio station 110 over a certain time period. The playlist 200 can be communicated to the first server 130 directly from the radio station 100 via the network 160. Alternatively, a third party monitoring service 120 can generate the playlist 200 by listening to the radio station 110 and inputting data into a spreadsheet to show which songs were played at which times by which radio stations.

After dialing the number of the first server 130, the wireless communication device 170 is placed in communication with the first server 130, which uses an interactive voice response ("IVR") system to ask the party which radio station played the song of interest and what time that song was played (act 210). The first server 130 compares the entered station/time information with the playlist 200 to determine the song played by the radio station 110 at the indicated time. The first server 130 then plays a clip of the song to the party (act 220), and the party indicates whether or not that song was the song of interest (act 230). If the song is not the song of interest, the party can be given options to hear the next or previous song played by the radio station 110. Once the party has acknowledged that the song is the one of interest, the party can be given the option to download the song (act 250), to download the ring tone (act 260), or to rate the song (i.e., indicating whether and/or how much the party liked the song) (act 270). The fact that the party has identified the song as the one of interest and the party's rating ("love it," "hate it," "7 out of 10," etc.) is then stored with an identification of the associated song in a call log 280. (Either just the fact or even the recording of the party identifying the song. This is used to verify that the caller really rated this song in case someone later claims that (s)he called and rated a different song.) In this embodiment, the song rating option is considered a premium service, and the party is charged for the service by sending a premium SMS message 290 to the party's wireless communication device 170. A premium SMS message 290 is a "reverse-charge" text message that, when received by the party's wireless communication device 170, causes a charge to appear on the party's wireless-communication-device bill.

In this embodiment, when the party rates a song, the party is entered into a contest (this provides an incentive for the party to pay the charge to rate the song). As will be described in more detail below, the party wins a prize if the rated song is both played by the radio station 110 during a certain period of time and randomly selected as a contest-winning song. With reference to FIGS. 1 and 3, the first server 130 sends the playlist 200 to the second server 140 via the network 160 (alternatively, the second server 140, like the first server 130, can receive the playlist 200 from the radio station 110 or the monitoring service 120). The second server 140 then randomly selects a set of songs from the playlist 200. (As used herein, a "set" can have one or more than one member.) The second server 140 is preferably operated by an entity that is independent from the entity that operates the first server 130 to ensure that the selection of songs is truly random and not influenced by the entity running the contest (i.e., the entity operating the first server 130).

The randomly-selected songs 300 (in this example, there are four randomly-selected songs) are then sent to the third server 150 via the network 150. The third server also receives the call log 280 from the first server 130 via the network 150. The third server 150 then determines if there is a match between the songs in the call log 280 and the randomly-selected songs 300, i.e. if any party has rated one or more (in this case up to four) of the songs. The third server 150 is preferably operated by an entity that is independent from the entities that operate the first and second servers 130, 140 to prevent the contest results from being influenced by those two parties. If the song that was rated by the party is one of the randomly-selected song 300, the party is awarded a prize.

In one embodiment, the party can increase his chances of winning by placing multiple calls to rate multiple songs. In doing so, there is also a chance that the party will guess more than one randomly-selected song, and a tiered prize structure can be used so that size of the awarded prize increases as the number of songs that the party guesses correctly increases. FIG. 4 is a chart showing the probability of getting X songs right versus the number of calls placed by a party, assuming 500 unique songs (in this chart, 0% is statistical zero). If a caller has voted for one song during the time period, he has a certain probability of matching the randomly-selected song. If the songs match, he wins Prize A. As shown by this chart, the probably of getting one song correct increases as the number of calls increases. If the caller votes for two songs during this time period, the chances for getting one song right increases. In addition, there is now a possibility of getting two songs right. If the party gets two matches, he wins Prize B, which is greater than Prize A. The same advantages are true for calls three and four—the caller's chances of getting one and two (and three) songs correct are increased, with an increased prize given for an increased number of songs guessed correctly.

In one presently preferred embodiment, the prize for getting 4 out of 4 songs correct is the radio station's frequency in millions of dollars (e.g., $101.1 million for radio station 101.1 FM). Although the probably of guessing 4 out of the 4 randomly-selected songs is very small, there still is a chance that a party will be able to do this. Accordingly, the entity running the contest needs to be able to pay the largest possible payout. Instead of paying the prize out of the money collected from the premium changes for the service (which may not be enough to cover the top prize), the entity operating the contest can partner with an insurance company, which, in this embodiment, operates the second server 140. Of course, instead of using an insurance company to cover the cost, the prize money can be generated from the charges assessed to each contest entrant.

As mentioned above, in this embodiment, a tiered prize structure is used so that the size of the awarded prize increases as the number of songs that the party guesses correctly increases (i.e., if the party votes for one song during the time period and that song matches a randomly-selected song, the party wins prize A; while if the party votes for two songs during the time period and those two songs match two of the randomly-selected songs, the party wins prize B, which is greater than prize A; etc.). Accordingly, there is an incentive for the user to select multiple songs, thereby increasing the revenue stream of the contest provider.

It will be recognized that a party would have a 100% chance of getting all four randomly-selected songs right if the party votes enough times to select every possible song played during the time period. This would be particularly enticing if the premium charge is relative small compared to the top prize (e.g., $0.99 per call vs. a top prize of $101 million). Accordingly, it is preferred that once a party makes a number of guesses equal to the number of randomly-selected songs, the next guess is put into a new "group." Accordingly, the fifth call in the above example is, in essence, a first call in a second group. This would continue, with the sixth call being the second call in the second group, the seventh call being the third call in the second group, and the eighth call being the fourth call in the second group. The ninth call would be a first call in a third group, and so on. This would enable parties to call in as often as they want without guaranteeing that they will win the top prize.

There are several alternatives that can be used with these preferred embodiments. For example, a party does not need to go through each of the acts 210, 220, 230, 240 described above to present a song guess, and a party can present a guess without rating a song. Accordingly, the phrase "receiving a selection of a song from a party" is being used herein to refer to either situation (and other situations not mentioned herein). Also, while a party's song guesses were communicated to the first server 130 using an IVR, the party's song guesses can be communicated via a text message, via direct voice communication with a live operator, via the Internet (e.g., via a web site), or via any other suitable mechanism. Also, while the wireless telecommunication device 170 was used to communicate the party's song guesses to the first server 130 in FIG. 1, the song guesses can be communicated in other ways. For example, the party can use a web page to submit song guesses via the Internet or can mail a postcard or letter with written song guesses. Of course, many other alternatives are possible. Also, it should be clear that the specific time periods, points, fees, awards, etc. used above to describe the preferred embodiments were merely examples and that other possibilities can be used. For example, a contest can run over a different period of time (i.e., other than one week), and fewer or greater than four songs can be randomly selected from a playlist. In another alternative, instead of randomly selecting songs from a playlist of a single radio station, songs can be randomly selected from playlists of various radio stations or of various formats (e.g., radio stations and television stations). Also, instead of just specifying the song, the contest can require the party to also specify song occurrence (i.e., when (e.g., time of day) the song will be played).

The forgoing detailed description has described only a few of the many possible implementations of the present invention. For this reason, this detailed description is intended by way of illustration, and not by way of limitation. It is only the following claims, including all equivalents, that are intended to define the scope of this invention.

What is claimed is:

1. A method for playing a game, the method comprising:

(a) receiving a selection of a plurality of songs from a party;

(b) identifying a playlist of songs played during a time period;

(c) randomly selecting a set of songs from the playlist;

(d) grouping the plurality of songs received in (a) into separate groups if a number of songs received in (a) is greater than a number of songs randomly selected in (c);

(e) determining if any of the plurality of songs in (a) is in the set of songs randomly selected in (c); and (f) awarding a prize to the party if any of the plurality of songs in (a) is in the set of songs randomly selected in (c), wherein a size of the prize awarded in (f) increases as a number of songs of the plurality of songs that are in the set of songs randomly selected in (c) increases.

2. The method of claim 1, wherein (a) is performed when the party communicates with a service to rate the song.

3. The method of claim 1, wherein the playlist comprises songs played by a single radio station.

4. The method of claim 1, wherein the playlist comprises songs played by a single television station.

5. The method of claim 1, wherein the playlist comprises songs played during the time period are played by a plurality selected from the following: any of a plurality of radio stations and any of a plurality of television stations.

6. The method of claim 1, wherein (a) comprises receiving a selection of a plurality of songs from the party, wherein (d) comprises determining if any of the plurality of songs in (a) is in the set of songs randomly selected in (c), and wherein (e) comprises awarding a prize to the party if any of the plurality of songs in (a) is in the set of songs randomly selected in (c), wherein a size of the prize awarded in (e) increases as a number of songs of the plurality of songs that are in the set of songs randomly selected in (c) increases.

7. The method of claim 6, wherein if a number of songs in the plurality of songs is greater than a number of songs in the set of songs randomly selected in (c), putting the excess songs in a separate group.

8. The method of claim 1, wherein (a) is performed by a first entity, (c) is performed by a second entity, and (d) is performed by a third entity, wherein the first, second, and third entities are separate entities.

9. The method of claim 1, wherein the playlist is provided by a monitoring service.

10. The method of claim 1, wherein (a) comprises receiving a selection of a song and an identification of when the song will be played from a party, wherein (d) comprises determining if the song in (a) is in the set of songs randomly selected in (c) and if the identification of when the song will be played matches when the song was actually played, and wherein (e) comprises awarding a prize to the party if the song is in the set of songs randomly selected in (c) and the identification of when the song will be played matches when the song was actually played.

11. The method of claim 1, wherein the selection is received in (a) from a wireless telecommunication device.

12. A method for playing a game comprising receiving a selection of a plurality of songs from a party, randomly selecting a set of songs played during a time period, grouping the plurality of songs received from the party if a number of the plurality of songs is greater than a number of the set of songs randomly selected, wherein if any of the plurality of songs selected by the party matches any of the songs in the randomly-selected set, the party is awarded a prize, further wherein the prize increases as a number of songs of the plurality of songs that match any of the songs in the randomly-selected set increases.

13. The method of claim 12, wherein the selection of the song is received from a wireless telecommunication device.

14. The method of claim 12, wherein the randomly-selected songs are selected from songs played by a radio station during the time period.

* * * * *